A. MACKEY.

Centrifugal Sugar Machine.

No. 2,708. Reissued July 30, 1867.

Witnesses

J. M. Coomly

G. W. Reed.

Inventor:

Alex Mackey

United States Patent Office.

ALEXANDER MACKEY, OF NEW YORK, N. Y.

*Letters Patent No.* 65,923, *dated June* 18, 1867; *reissue No.* 2,708, *dated July* 30, 1867.

IMPROVEMENT IN CENTRIFUGAL SUGAR MACHINES.

The Schedule referred to in these Letters Patent and making part of the same.

TO ALL WHOM IT MAY CONCERN:

Be it known that I, ALEXANDER MACKEY, of the city, county, and State of New York, have invented a new and useful Improvement in Centrifugal Sugar Machines; and I do hereby declare that the following is a full, clear, and exact description of the same, reference being had to the accompanying drawings, in which—

Similar letters of reference indicate corresponding parts in all the figures.

Figure 1:
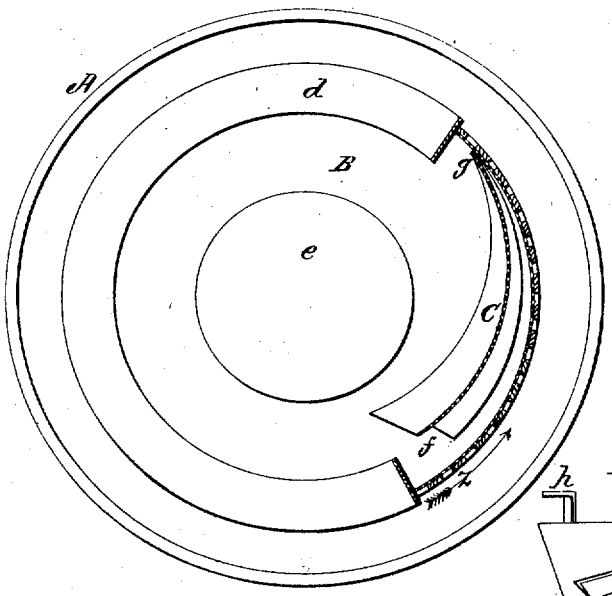
Figure 1 is a plan of a centrifugal sugar machine, with a portion broke away, to better illustrate my invention as applied thereto.
Figure 3:
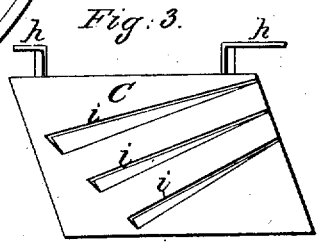
Figure 3 is a back view of the distributor forming my improvement, detached from the machine.
Figure 2:
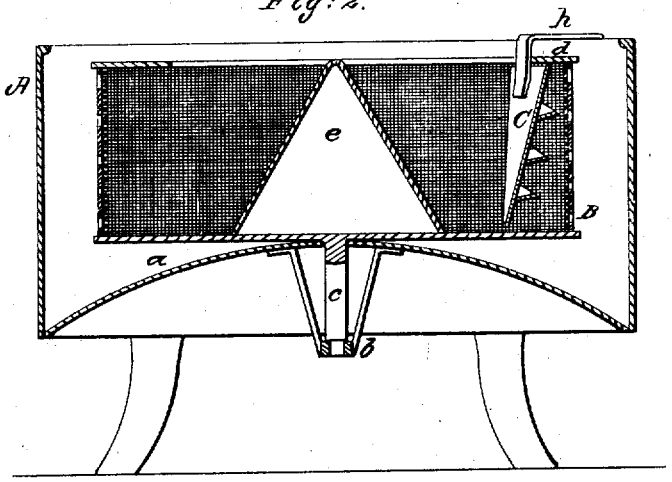
Figure 2 is a vertical section of the same, taken in the line *x x* of fig. 1.

My improvement relates to centrifugal sugar machines generally, but more especially those used for refining or raising the grade of raw or dry sugar by a single washing operation. In performing this process the sugar is put into the machine dry, and it is desirable to spread or distribute it all around and against the sides of the centrifugal cylinder before introducing the water for washing; but when the sugar is in the dry state the centrifugal force is not sufficient so to spread or distribute it, and hence the necessity for some mechanical device for so spreading or distributing it. And to this end our invention consists in a distributor arranged within the cylinder, but detached therefrom in such manner that when the centrifugal cylinder is set in rotation the sugar is caused to pass upward and outward toward the periphery of such cylinder.

To enable others to understand the construction and operation of my invention, I will proceed to describe it with reference to the drawings.

The drawings represent that form of my invention which I consider preferable, A representing the cylindrical case of the machine, made of any suitable material, and the bottom *a* of which may be of hemispherical configuration, and be provided with a hanger, *b*, to carry the vertical shaft *c* of the revolving cylinder B. This cylinder B is or may be of the ordinary construction; that is, its sides formed of a perforated metal backing to a lining of wire cloth, and said cylinder further provided with an internally overhanging upper flange *d* and central cone *e*. The requisite rotary motion, in the direction of the arrow *z*, is communicated to the cylinder B in any suitable way, and it may rest centrally underneath upon the top of the hemispherical bottom *a* of the case, the depressed surface of which serves to receive the liquid ejected by the cylinder B into the annular space between the said cylinder and case. Within the cylinder B, and arranged near one side of it, for the depth of the cylinder or thereabouts, and for the most part under cover of the flange *d*, is a distributor C. This distributor should be immediately in front of the space over the cylinder into which the sugar is fed, and consists of a plate that may be of curvilinear form in the direction of its length, and which is set shelving or inclining inwardly in a downward direction for the greater portion of its length, preferably inclining most at its edge nearest the feed, and gradually diminishing in inclination toward the edge furthest therefrom, and is likewise set eccentrically in relation to the cylinder, so as to present a wide mouth *f*, and narrower discharge-opening *g*, and so that at its foot nearest the feed it approximates the base of the cone *e*, but gradually increases in distance therefrom toward its discharge edge. Said distributor being detached from the cylinder B, may be held to the case A by straps *h*, or in any other suitable way prevented from moving with the aforesaid cylinder; and in addition to the construction already described for or of it, the back of the distributor should be provided with any suitable number of elevating strips or flanges *i*, arranged one above the other, and set spirally inclining upwards from the feed toward the discharge, also each of the said flanges being preferably longer than the next below it.

In the operation of the machine the sugar, as it is fed into the cylinder B, immediately in rear of the distributor C, is hurled or worked by the cylinder or through behind the said distributor, the shelving and eccentric construction of which, including its flanges *i*, will tend to keep the sugar forced outward toward the periphery of the cylinder, acting also as a continuous distributor to the incoming sugar, which, by the time it is discharged from behind the distributor, will have acquired sufficient centrifugal force to keep it up to the inside of the cylinder's periphery, when the centrifugal action of the cylinder will retain it there, and, in conjunction with the agitation kept up by the distributor, serve to act upon the sugar in the most effective manner, in the process of purifying the sugar by washing it in its raw state within the cylinder. Instead of having the distributor C inclining inwardly in a downward direction for the greater portion of its length, commencing with the feed end, it may incline outwardly in an upward direction, so as to have its feed-opening more contracted at the base than at the top, in which case the flanges *i* may be dispensed with, and the sugar be fed behind the distributor C, at its top, near the feed end, by a pipe; or the said distributor may be otherwise constructed to guide and lift or keep up the sugar against the inner periphery of the revolving cylinder during the early portion of the deposit therein, as specified.

What I claim as my invention, and desire to secure by Letters Patent, is—

1. The combination, with the centrifugal cylinder, of a distributor arranged within but detached from the said cylinder, substantially as and for the purpose herein set forth.

2. The distributor C, constructed essentially as shown, in combination with the centrifugal cylinder B, and arranged in relation thereto substantially as and for the purpose herein set forth.

ALEX'R MACKEY.

Witnesses:

J. W. COOMBS,

G. W. REED,